US008634159B2

(12) United States Patent
Huang et al.

(10) Patent No.: US 8,634,159 B2
(45) Date of Patent: Jan. 21, 2014

(54) MAGNETIC RECORDING DISK DRIVE WITH THREE SENSORS FOR ROTATIONAL AND LINEAR VIBRATION COMPENSATION

(75) Inventors: Fu-Ying Huang, San Jose, CA (US); Xiaotian Sun, Saratoga, CA (US)

(73) Assignee: HGST Netherlands B.V., Amsterdam (NL)

( * ) Notice: Subject to any disclaimer, the term of this patent is extended or adjusted under 35 U.S.C. 154(b) by 89 days.

(21) Appl. No.: 13/427,762

(22) Filed: Mar. 22, 2012

(65) Prior Publication Data

US 2013/0250451 A1 Sep. 26, 2013

(51) Int. Cl.
*G11B 5/596* (2006.01)
(52) U.S. Cl.
USPC .................................... 360/77.02
(58) Field of Classification Search
USPC ................ 360/55, 75, 77.02, 78.04
See application file for complete search history.

(56) References Cited

U.S. PATENT DOCUMENTS

| | | | | |
|---|---|---|---|---|
| 5,663,847 A * | 9/1997 | Abramovitch | | 360/77.02 |
| 6,496,320 B1 * | 12/2002 | Liu | | 360/75 |
| 6,961,202 B2 | 11/2005 | Ikedo et al. | | |
| 7,035,034 B2 * | 4/2006 | Semba et al. | | 360/75 |
| 7,177,113 B1 * | 2/2007 | Semba et al. | | 360/77.07 |
| 7,345,841 B2 * | 3/2008 | Baugh et al. | | 360/75 |
| 7,375,916 B2 * | 5/2008 | Semba et al. | | 360/77.04 |
| 7,561,365 B2 | 7/2009 | Noguchi et al. | | |
| 7,580,217 B2 * | 8/2009 | Abe et al. | | 360/77.02 |
| 7,706,099 B2 * | 4/2010 | Uchida et al. | | 360/77.02 |
| 8,027,119 B2 * | 9/2011 | Zhang | | 360/77.02 |
| 2010/0067357 A1 | 3/2010 | Huang et al. | | |
| 2011/0085260 A1 | 4/2011 | Wada et al. | | |

FOREIGN PATENT DOCUMENTS

JP 09045024 A 2/1997

OTHER PUBLICATIONS

Computer translation of JP, 09-045024, Jan. 14, 1997.*

* cited by examiner

*Primary Examiner* — Tan X Dinh
(74) *Attorney, Agent, or Firm* — Thomas R. Berthold

(57) ABSTRACT

A magnetic recording disk drive has three vibration sensors mounted to the disk drive base to provide feedforward vibration compensation signals. First and second spaced-apart sensors are aligned generally parallel to a radius from the disk rotational axis to a head position on the disk between the inside diameter position ($h_{ID}$) and outside diameter position ($h_{OD}$) for detecting rotational vibration about the disk rotational axis and linear vibration in the cross-track direction. A third vibration sensor is aligned generally orthogonal to the primary axes of the first and second vibration sensors for detecting primarily linear vibrations in the along-the-track or track circumferential direction. The disk drive servo control processor calculates, from the signals from the three sensors, a rotational vibration feedforward signal, a radial linear vibration feedforward signal, and a circumferential linear vibration feedforward signal which are summed with the actuator control signal to compensate for the vibrations.

12 Claims, 4 Drawing Sheets

MAGNETIC RECORDING DISK DRIVE WITH THREE SENSORS FOR ROTATIONAL AND LINEAR VIBRATION COMPENSATION

BACKGROUND OF THE INVENTION

1. Field of the Invention

This invention relates generally to magnetic recording disk drives, and more particularly to a disk drive that includes a system for canceling the effects of rotational and linear vibration.

2. Description of the Related Art

Magnetic recording hard disk drives use an actuator, typically a rotary voice-coil-motor (VCM) actuator, for positioning the read/write heads on the data tracks of the recording disks. The disk drive has a servo control system that receives a position error signal (PES) from servo positioning information read by the heads from the data tracks and generates a VCM control signal to maintain the heads on track and move them to the desired track for reading and writing of data.

Disk drives experience rotational vibration (RV) and disturbance forces during normal operation. These disturbances arise internally, such as from motion of the VCM actuator, as well as externally, such as from shocks to the frame supporting the disk drive or from the movement of other disk drives when the drives are mounted together in a disk array system. RV tends to rotate the disk drive housing about an axis parallel to the axis of disk rotation and thus moves the disks relative to the actuator. RV cancellation is a method that uses sensors to detect RV and improve the PES by canceling the off-track motion induced by the RV. One approach uses two linear accelerometers or vibration sensors, typically mounted on the disk drive's printed circuit board, to measure the RV. The measured RV is input to a feedforward controller that creates a feedforward compensation signal that is summed with the control signal to the VCM actuator. This method is sometimes called RV feedforward (RV-FF). Disk drives with two vibration sensors for RV-FF are described in U.S. Pat. No. 6,961,202 B2 and US 20100067357 A1, both assigned to the same assignee and this application.

However, disk drives are also subject to translational or linear vibration and disturbance forces, which tend to move the disk drive housing along an axis parallel to the disks. Linear vibration in the disk radial or cross-track direction is also major a cause of off-track motion of the head. Linear vibration in the disk circumferential or along-the-track direction is also a cause of off-track motion of the head. U.S. Pat. No. 6,496,320 B1 describes a disk drive with three linear accelerometers that detect linear vibration along orthogonal x and y axes aligned with the width and length of the disk drive housing.

What is needed is a disk drive that detects and compensates not only for RV but also for linear vibrations in both the cross-track and along-the-track directions.

SUMMARY OF THE INVENTION

A magnetic recording disk drive has three vibration sensors, e.g., single-axis accelerometers, mounted to the disk drive base, preferably to the printed circuit board attached to the base, to provide feedforward vibration compensation signals. First and second spaced-apart sensors have their primary sensitivity axes aligned generally parallel to a radius from the disk rotational axis to a head position on the disk between the inside diameter position ($h_{ID}$) and outside diameter position ($h_{OD}$) for detecting rotational vibration about the disk rotational axis and linear vibration in the cross-track direction. A third vibration sensor has its primary sensitivity axis aligned generally orthogonal to the primary axes of the first and second vibration sensors for detecting primarily linear vibrations in the along-the-track or track circumferential direction. The disk drive servo control processor calculates a rotational vibration feedforward (RV-FF) signal representing the difference between the signals from the first and second sensors, a radial linear vibration feedforward (LVr-FF) signal representing the sum of the signals from the first and second sensors, and a circumferential linear vibration feedforward (LVc-FF) signal from the signal from the third sensor. The three feedforward signals are summed with the actuator control signal to compensate for the vibrations to the disk drive.

For a fuller understanding of the nature and advantages of the present invention, reference should be made to the following detailed description taken together with the accompanying figures.

DETAILED DESCRIPTION OF THE INVENTION

Figure 1:
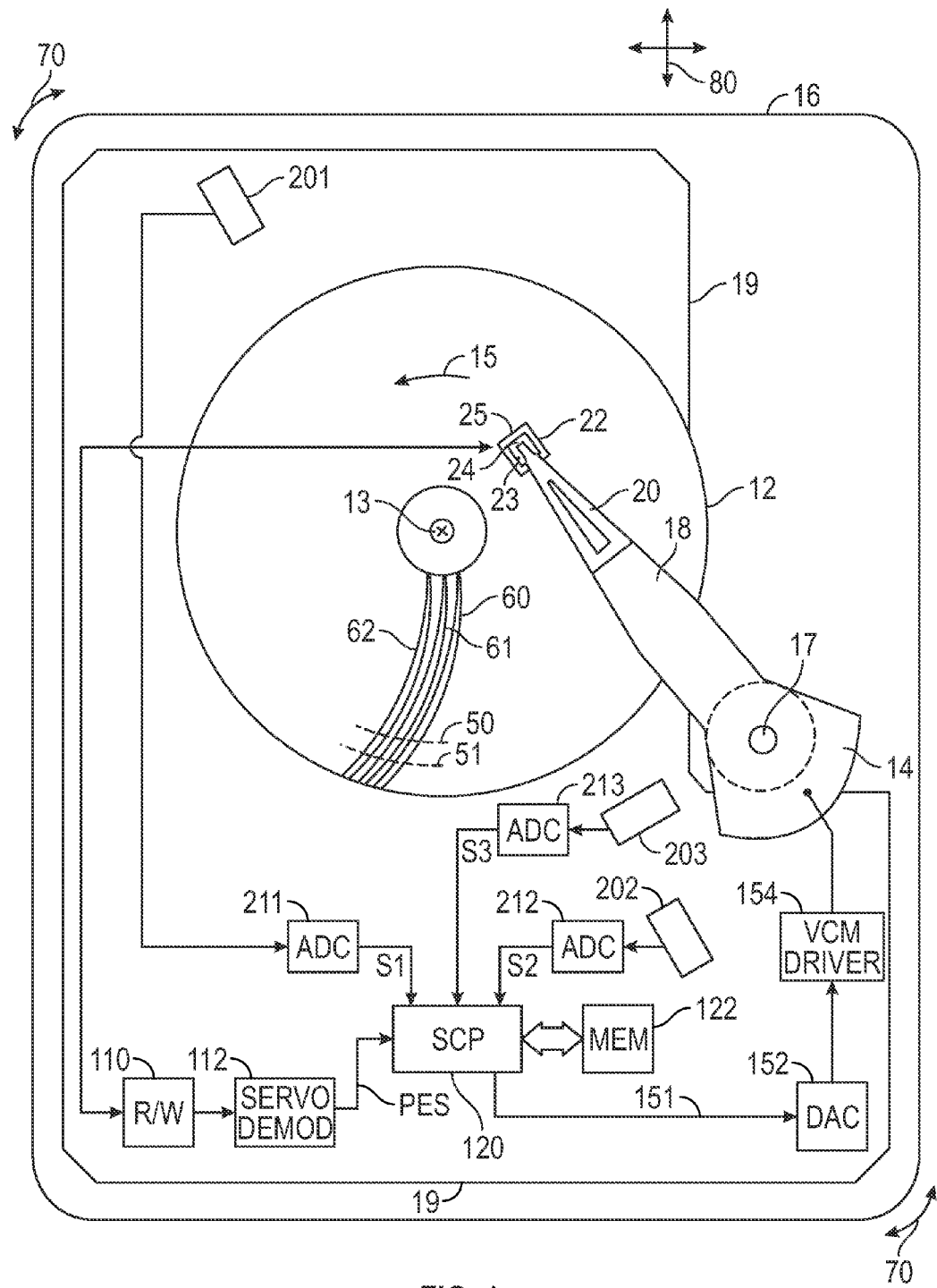
FIG. 1 is a schematic top view of a magnetic recording hard disk drive according to the invention with three linear vibration sensors for rotational vibration feedforward (RV-FF), radial linear vibration feedforward (LVr-FF) and circumferential linear vibration feedforward (LVc-FF).

FIG. 1 is a block diagram of a magnetic recording hard disk drive according to the invention. The disk drive includes a magnetic recording disk 12 that is rotated about an axis of rotation 13 in direction 15 by a spindle motor (not shown) mounted to the disk drive housing or base 16. A printed circuit board 19 is attached to housing 16 and supports the disk drive electronics. The disk 12 has a magnetic recording layer patterned into magnetizable blocks that define concentric data tracks, such as typical tracks 50, 51, and servo sectors, such as typical servo sectors 60, 61, 62. The servo sectors extend generally radially across the concentric data tracks so that each data track has a plurality of equally-angularly spaced servo sectors that extend around the track. Each of the servo sectors in a data track typically contains a servo timing mark (STM) that indicates the start of the servo sector, a track identification (TID) code, and a portion of a pattern of magnetized blocks or high-frequency bursts that are decoded or demodulated to provide a head position error signal (PES).

The disk drive also includes a rotary voice coil motor (VCM) actuator 14 supported on the base 16. The actuator 14 pivots about axis 17 and includes a rigid actuator arm 18. A generally flexible suspension 20 includes a flexure element 23 and is attached to the end of arm 18. A head carrier or air-bearing slider 22 is attached to the flexure 23. A magnetic recording read/write (R/W) head 24 is formed on the trailing surface 25 of slider 22. The flexure 23 and suspension 20 enable the slider to "pitch" and "roll" on an air-bearing generated by the rotating disk 12.

As the disk 12 rotates in the direction 15, the positioning information in the servo sectors is read by the read head and sent to R/W electronics 110. The servo pattern demodulator 112 receives input from R/W electronics 110 and demodulates the positioning information in the servo sectors to provide a digital signal that is compared with a position reference to generate the PES to the servo control processor (SCP) 120. The SCP 120 may be a dedicated processor or other microprocessor and is coupled to associated memory 122.

The servo control processor 120 uses the PES as input to a control algorithm to generate a control signal for the VCM 14. As is well-known in the art, the control algorithm recalls from memory 122 a "controller", which is a set of parameters based on the static and dynamic characteristics of the "plant" being controlled, i.e., the VCM 14. The control algorithm is essentially a matrix multiplication algorithm, and the controller parameters are coefficients used in the multiplication and stored in memory 122 accessible by the processor 120.

The disk drive is subject to rotational vibration (RV) or disturbances, as shown by arrows 70, that arise both internally, such as from motion of the VCM 14, and externally, such as from shocks to the frame supporting the disk drive or from the movement of other disk drives when the drives are mounted together in a disk array system. RV tends to rotate the disk drive base 16 about an axis parallel to the axis 13 of disk rotation and thus moves the disk 12 relative to the actuator 14. The disk drive is also subject to translational or linear vibration (LV) or disturbances, which tend to move the disk drive base 16 along an axis parallel to the disk 12, as shown by arrows 80. The RV and LV disturbances cause track misregistration (TMR) of the read/write heads. In this invention there are three, and preferably only three, vibration sensors 201, 202 and 203 with specific orientation and placement on the base 16 to optimize the detection and subsequent cancellation of RV and LV. The vibration sensors are preferably linear accelerometers, such as commercially available piezoelectric single-axis accelerometers available from Murata Manufacturing Company, Ltd., (e.g., Models PKGS-00LDP1-R, PKGS-00GXP1-R and PKGS-00MFP1-R). The accelerometers are typically attached to the printed circuit board 19, which is attached to base 16, but may also be attached to other portions of the base 16.

The outputs of the linear accelerometer 201, 202, 203 are digitized by analog-to-digital converters (ADCs) 211, 212, 213, respectively, which provide digital sensor signals S1, S2, S3, respectively, to servo control processor 120. While not shown in FIG. 1, the outputs of the linear accelerometers 201, 202, 203 may be passed through suitable filters for noise removal and phase adjustment. The servo control processor 120 uses the signals S1, S2, S3 to calculate a RV feedforward (RV-FF) for rotational vibrations, a radial linear vibration feedforward signal (LVr-FF) signal for vibrations in the radial or across-the-data-track direction, and a circumferential linear vibration feedforward signal (LVc-FF) signal for vibrations in the circumferential or along-the-data-track direction. The three feedforward signals are used to modify the control signal calculated by the control algorithm. The SCP 120 thus provides a modified or digital compensated control signal 151 to digital-to-analog converter (DAC) 152. The output of DAC 152 controls VCM driver 154, which controls the current to the VCM 14 to move the read/write head 24 to the desired data track and maintain it on track for reading and writing of data.

Figure 2:
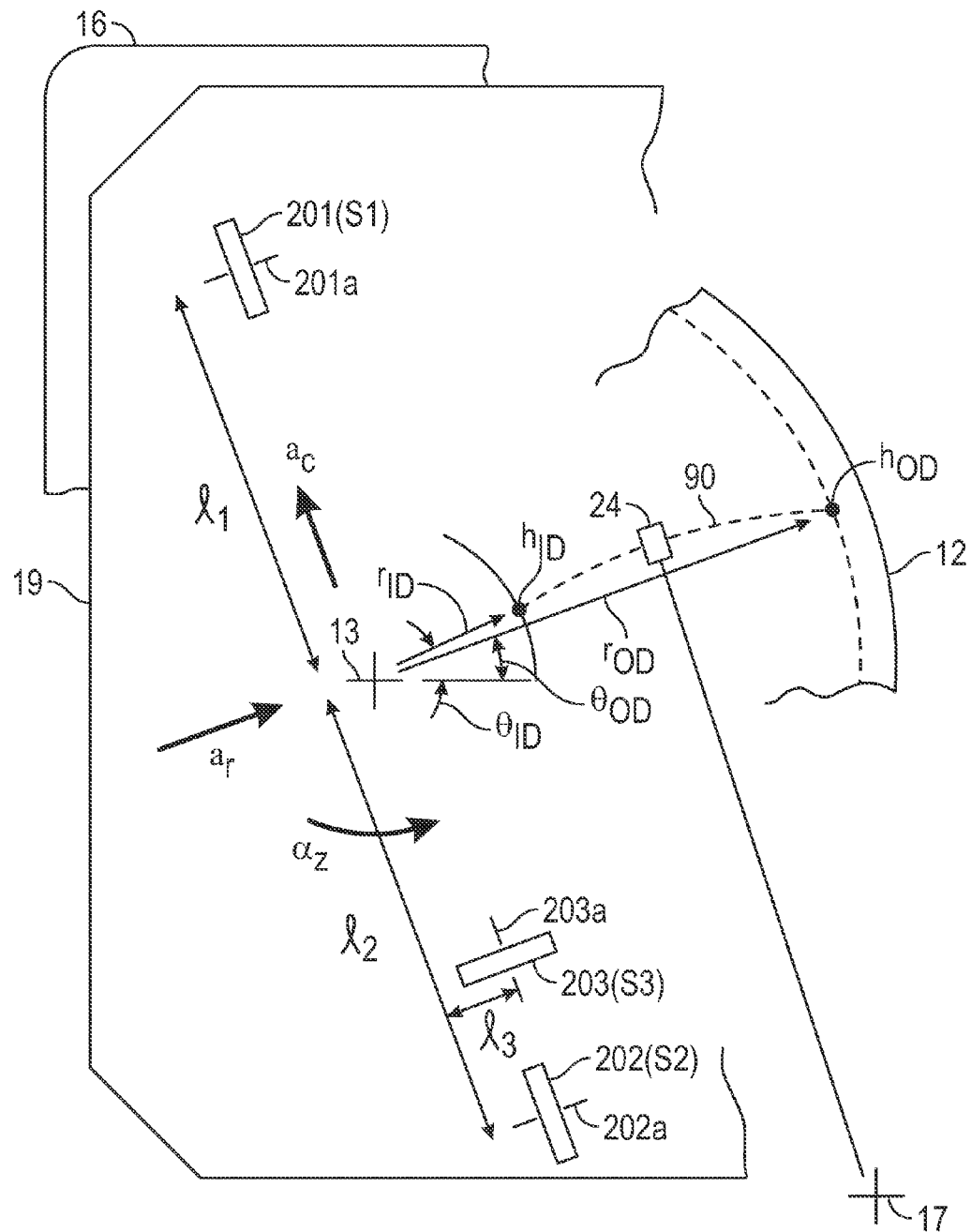
FIG. 2 is a schematic showing the locations of the three vibration sensors on the printed circuit board relative to the spindle rotation axis and actuator pivot.
Figure 3:
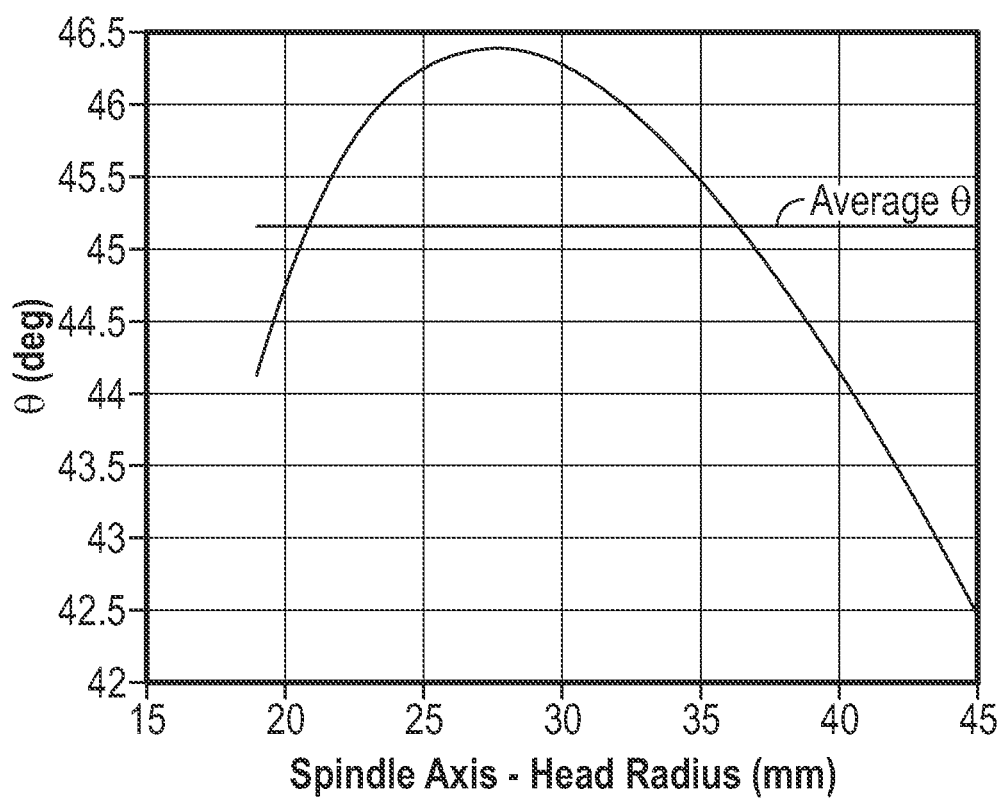
FIG. 3 is graph of the angle θ that the radius from the spindle axis to the head position makes as a function of the radius for a typical 3.5 inch form factor disk drive.

FIG. 2 is a schematic showing the locations of the vibration sensors 201, 202, 203 on the printed circuit board 19 attached to base 16 relative to the spindle rotation axis 13 and actuator pivot 17. The recording head 24 makes an arcuate path 90 across the disk 12 from a head inside diameter ($h_{ID}$) to a head outside diameter ($h_{OD}$). At the $h_{ID}$ the radius $r_{ID}$ from the spindle rotational axis 13 to the $h_{ID}$ position makes an angle $\theta_{ID}$ relative to an x-y coordinate system with disk drive length and width. At the $h_{OD}$ the radius $r_{OD}$ from the spindle rotational axis 13 to the $h_{OD}$ position makes an angle $\theta_{OD}$. In this invention the first and second vibration sensors have their primary axes (i.e., their sensitivity axes) 201a, 202a, respectively, aligned generally parallel with the spindle axis-head radius. As used herein, the spindle axis-head radius (i.e., the radius from the spindle rotational axis 13 to the head 24) means any radius from axis 13 to any position along arcuate path 90, i.e. any position between $h_{ID}$ and $h_{OD}$. This is because for most disk drives the variation of the angle θ with head position along arcuate path 90 is very small, for example only a few degrees for a 3.5 in. form factor disk drive. FIG. 3 is graph of θ as a function of spindle axis-head radius for a typical 3.5 inch form factor disk drive. The angle θ is about 44 degrees at $r_{ID}$, increases to about 46.5 degrees at about one-third of the arcuate path and then decreases to about 42.5 degrees at $r_{OD}$. The horizontal line at about 45.2 degrees is the average value of θ, which would correspond to the preferred or optimal spindle axis-head radius with which the vibration sensors axes 201a, 202a would be aligned.

As shown in FIG. 2 vibration sensors 201, 202 detect radial linear acceleration ($a_r$) in the spindle axis-head direction, which is across the data tracks. However, because the vibration sensors are spaced from spindle axis 13 by distances $l_1$ and $l_2$, respectively, they also detect angular or rotational acceleration ($\alpha_Z$) about spindle axis 13. The vibration sensors 201, 202 provide the following analog signal outputs S1, S2, respectively:

$$S1 = a_r - \alpha_Z l_1 \qquad \text{Eq. (1)}$$

$$S2 = a_r + \alpha_Z l_2 \qquad \text{Eq. (2)}$$

From Equations (1) and (2) the values of radial linear acceleration $a_r$ and rotational acceleration $\alpha_Z$ are as follows:

$$a_r = (l_2 S1 + l_1 S2)/(l_1 + l_2) \qquad \text{Eq. (3)}$$

$$\alpha_Z = (S2 - S1)/(l_1 + l_2) \qquad \text{Eq. (4)}$$

The sensors 201, 202 are preferably spaced as far apart as possible, consistent with available space on the printed circuit board 19, so as to maximize the response to RV. The sensors 201, 202 are also preferably aligned along a line through spindle axis 13 so as to simplify the equation for calculation of $\alpha_Z$.

As shown in FIG. 2 vibration sensor 203 has its primary axis 203a aligned orthogonal to axes 201a, 202a and thus detects circumferential linear acceleration ($a_c$) in the direction orthogonal to the spindle axis-head radius, i.e., in the circumferential or along-the-track direction. The vibration sensor 203 has its sensitivity axis 203a spaced a distance $l_3$ from spindle axis 13 and thus provides the following analog signal output S3:

$$S3 = a_c + \alpha_Z l_3 \approx a_c \text{ (if } l_3 \approx 0) \qquad \text{Eq. (5)}$$

The value of circumferential linear acceleration $a_c$ is thus:

$$a_c = s3 - \alpha_Z l_3 \approx s3 \text{ (if } l_3 \approx 0) \qquad \text{Eq. (6)}$$

The sensor 203 may be located anywhere but is preferably located with its axis 203a aligned with a line through spindle axis 13, or with $l_3$ as small as possible, consistent with available space on the printed circuit board 19, so as to simplify the calculation of $a_c$.

Figure 4:
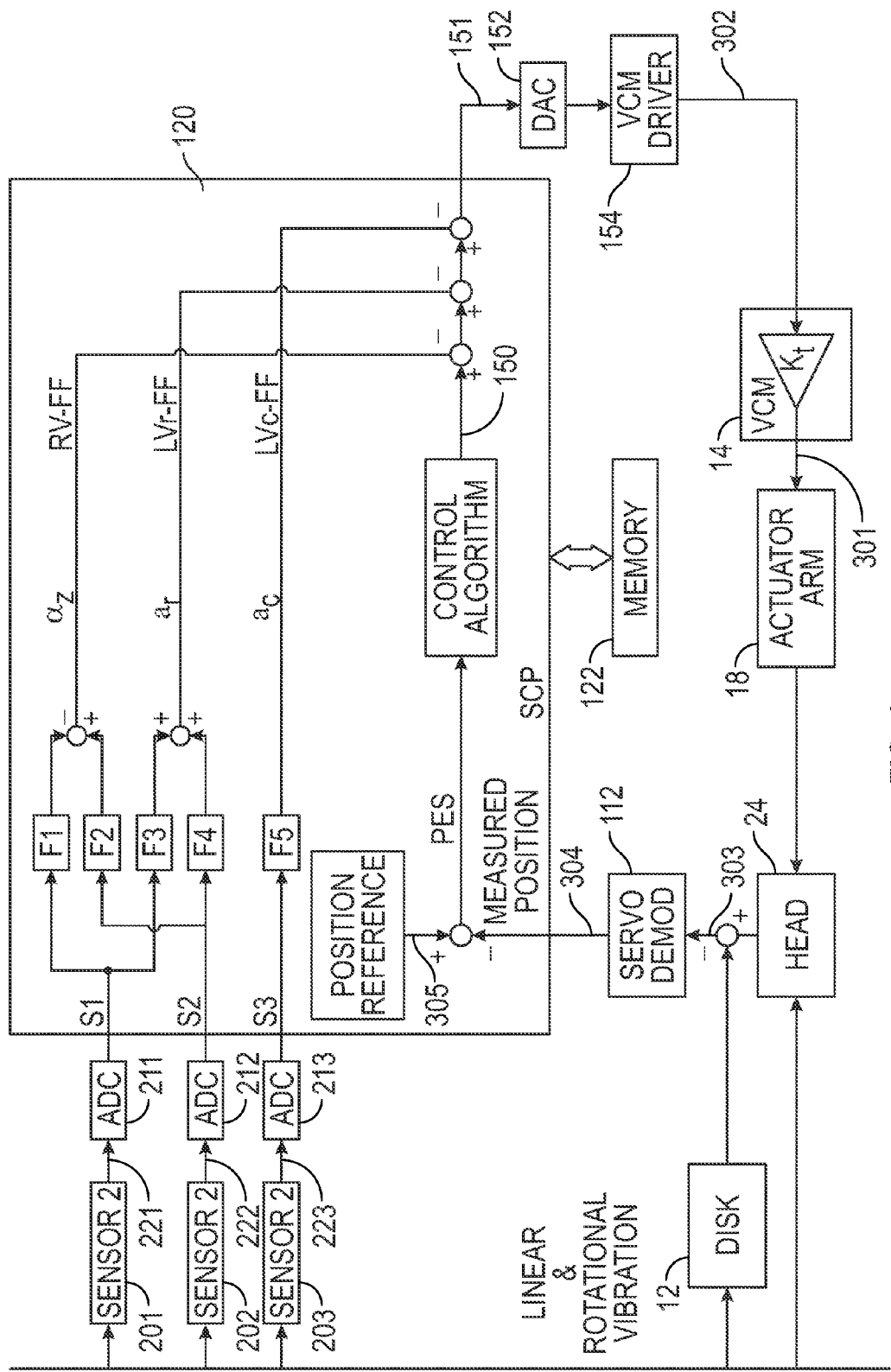
FIG. 4 is a block diagram of the sampled servo control system of the disk drive shown in FIG. 1 illustrating the rotational and linear vibration compensation according to the invention.

FIG. 4 is a block diagram of the sampled servo control system of the disk drive shown in FIG. 1. As shown in FIG. 4, VCM 14 is characterized by a torque output parameter 301.

The servo control system includes DAC 152 that receives the modified control signal 151 and VCM driver 154 that provides an operating current 302 to VCM 14 based on the modified control signal 151 for causing the actuator arm 18 to carry the head 24 across the surface of the disk 12. The position of head 24, indicated by head location signal 303, is concurrently monitored by servo pattern demodulator 112 which outputs a digital signal 304, corresponding to the head location signal 303. The digital signal 304 corresponds to an indicated track position and off-track percentage value. The digital signal 304 is then combined with a signal corresponding to a position reference 305 to generate a position error signal (PES) that is received by the servo control processor (SCP) 120. The SCP 120 uses the PES to run a control algorithm to generate a control signal 150.

The three single-axis accelerometers 201, 202, 203 provide analog signals 221, 222, 223, respectively, to analog-to-digital converters (ADCs) 211, 212, 213, respectively, which provide digital sensor signals S1, S2, S3, respectively, to SCP 120. As shown in FIG. 4, the sensor signals 221, 222, 223 are generated in response to both rotational and linear vibration disturbances that also affect head 24 and disk 12. Digital sensor signals S1, S2, S3 are combined and passed through suitable feedforward controllers (filters) F1-F5 for noise removal, phase adjustment and frequency compensation, as shown in FIG. 4. The filters F1-F5 may be fixed or adaptive. The processor 120 uses S1, S2, S3 to calculate $a_r$, $\alpha_z$ and $a_c$ as part of the calculation of the feedforward signals RV-FF, LVr-FF and LVc-FF. The feedforward signals RV-FF, LVr-FF and LVc-FF are then summed with the control signal 150 to generate the RV and LV compensated control signal 151.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetic recording disk drive comprising:
    a disk drive base;
    a spindle motor attached to the base and having a rotational axis;
    a magnetic recording disk mounted to the spindle motor for rotation about said rotational axis;
    a rotary actuator attached to the base;
    a recording head attached to the actuator and movable across the disk in a generally arcuate path from a head inside diameter position ($h_{ID}$) to a head outside diameter position ($h_{OD}$);
    a first vibration sensor attached to the base and having a vibration sensitivity axis generally parallel to a radius from the spindle motor rotational axis to a head position between $h_{ID}$ and $h_{OD}$;
    a second vibration sensor attached to the base, the second vibration sensor being spaced from the first vibration sensor and having a vibration sensitivity axis generally parallel to the vibration sensitivity axis of the first vibration sensor; and
    a third vibration sensor attached to the base and having a vibration sensitivity axis generally orthogonal to the vibration sensitivity axis of the first vibration sensor.

2. The disk drive of claim 1 wherein the disk drive includes a printed circuit board attached to the base and wherein the first, second and third vibration sensors are mounted on the printed circuit board.

3. The disk drive of claim 1 wherein there are three and only three vibration sensors.

4. The disk drive of claim 1 wherein each of the vibration sensors is a single-axis accelerometer.

5. The disk drive of claim 1 wherein the spaced-apart first and second vibration sensors are aligned along a line through said rotational axis.

6. The disk drive of claim 1 wherein the third vibration sensor has its sensitivity axis aligned along a line through said rotational axis.

7. A magnetic recording disk drive comprising:
    a disk drive base;
    a spindle motor attached to the base;
    a magnetic recording disk mounted to the spindle motor and rotatable about an axis, the disk having a plurality of concentric data tracks containing servo positioning information;
    a recording head movable across the disk in a generally arcuate path from a head inside diameter position ($h_{ID}$) to a head outside diameter position ($h_{OD}$), the head being capable of reading data and servo positioning information in the data tracks;
    a voice-coil-motor (VCM) attached to the base for moving the head;
    first and second spaced-apart linear vibration sensors attached to the base and having primary axes generally parallel to a radius from the disk rotational axis to a head position between $h_{ID}$ and $h_{OD}$ for detecting rotational vibration about the disk rotational axis and linear vibration in the cross-track direction;
    a third linear vibration sensor attached to the base and a having a primary axis generally orthogonal to the primary axes of the first and second vibration sensors for detecting primarily linear vibrations in the track circumferential direction;
    a processor;
    memory associated with the processor;
    and a program of instructions stored in memory and readable by the processor for undertaking method acts comprising:
    (a) receiving a digitized signal S1 from the first linear vibration sensor, a digitized signal S2 from the second linear vibration sensor, and a digitized signal S3 from the third linear vibration sensor;
    (b) calculating a rotational vibration feedforward (RV-FF) signal from S1 and S2 representing the difference between S1 and S2;
    (c) calculating a radial linear vibration feedforward (LVr-FF) signal from S1 and S2 representing the sum of S1 and S2;
    (d) calculating a circumferential linear vibration feedforward (LVc-FF) signal from S3;
    (e) calculating a VCM control signal from the PES; and
    (f) modifying the VCM control signal with the RV-FF, LVr-FF and LVc-FF signal.

8. The disk drive of claim 7 wherein there are three and only three vibration sensors.

9. The disk drive of claim 7 wherein each of the vibration sensors is a single-axis accelerometer.

10. The disk drive of claim 7 wherein the spaced-apart first and second vibration sensors are aligned along a line through said rotational axis.

11. The disk drive of claim 7 wherein the third vibration sensor has its sensitivity axis aligned along a line through said rotational axis.

12. The disk drive of claim 7 wherein the disk drive includes a printed circuit board attached to the base and wherein the first, second and third vibration sensors are mounted on the printed circuit board.

* * * * *